United States Patent
Can et al.

(10) Patent No.: US 10,677,948 B2
(45) Date of Patent: Jun. 9, 2020

(54) CONTEXT BASED BOUNDED HYDROCARBON FORMATION IDENTIFICATION

(71) Applicants: GENERAL ELECTRIC COMPANY, Schenectady, NY (US); EXXONMOBIL UPSTREAM RESEARCH COMPANY, Spring, TX (US)

(72) Inventors: Ali Can, Niskayuna, NY (US); Erhan Bas, Ashburn, VA (US); Weina Ge, San Jose, CA (US); Shubao Liu, Windermere, FL (US); Xiaojie Huang, Schenectady, NY (US); Mary Katherine Johns, Houston, TX (US); Mark Wayne Dobin, The Woodlands, TX (US)

(73) Assignees: GENERAL ELECTRIC COMPANY, Schenectady, NY (US); EXXONMOBIL UPSTREAM RESEARCH COMPANY, Spring, TX (US)

( * ) Notice: Subject to any disclaimer, the term of this patent is extended or adjusted under 35 U.S.C. 154(b) by 798 days.

(21) Appl. No.: 15/265,495

(22) Filed: Sep. 14, 2016

(65) Prior Publication Data
US 2017/0254911 A1    Sep. 7, 2017

Related U.S. Application Data

(60) Provisional application No. 62/304,007, filed on Mar. 4, 2016.

(51) Int. Cl.
*G01V 1/30* (2006.01)
*G01V 1/28* (2006.01)
*G01V 1/34* (2006.01)

(52) U.S. Cl.
CPC ............ *G01V 1/306* (2013.01); *G01V 1/282* (2013.01); *G01V 1/301* (2013.01); *G01V 1/345* (2013.01); *G01V 2210/64* (2013.01)

(58) Field of Classification Search
CPC .................................................. G01V 2210/64
See application file for complete search history.

(56) References Cited

U.S. PATENT DOCUMENTS

| 6,789,054 B1 | 9/2004 | Makhlouf |
| 7,660,674 B2 | 2/2010 | Magill et al. |

(Continued)

FOREIGN PATENT DOCUMENTS

WO     2013012469 A1    1/2013

OTHER PUBLICATIONS

Eidsvik, J., et al.; "Stochastic Reservoir Characterization Using Prestack Seismic Data", Geophysics, Society of Exploration Geophysicists, vol. 69, No. 4, Jul. 1, 2004, pp. 978-993.

(Continued)

*Primary Examiner* — Catherine T. Rastovski
(74) *Attorney, Agent, or Firm* — Fletcher Yoder, P.C.

(57) ABSTRACT

A method of identifying bounded hydrocarbon formations of interest in a seismic data set includes obtaining a seismic data set, pre-processing the seismic data set, inputting the plurality of graphical model inputs and one or more rules to a graphical model, wherein the rules define a relationship between a plurality of attributes of a bounded hydrocarbon formation, running a graphical model on the graphical model inputs, post-processing the graphical model outputs, and displaying the ranked clusters in order of rank.

12 Claims, 11 Drawing Sheets

(56) References Cited

U.S. PATENT DOCUMENTS

| | | | |
|---|---|---|---|
| 8,219,320 | B2 | 7/2012 | Saenger |
| 8,447,524 | B2 | 5/2013 | Chen et al. |
| 9,297,918 | B2 | 3/2016 | Lim et al. |
| 2010/0174489 | A1 | 7/2010 | Bryant et al. |
| 2011/0255371 | A1 | 10/2011 | Jing et al. |
| 2012/0053839 | A1 | 3/2012 | Kugler et al. |
| 2013/0064040 | A1* | 3/2013 | Imhof .................... G01V 1/306 367/73 |
| 2013/0124171 | A1 | 5/2013 | Schuette et al. |
| 2014/0098637 | A1* | 4/2014 | Lin ....................... G01V 1/288 367/73 |
| 2014/0188769 | A1 | 7/2014 | Lim et al. |
| 2014/0278115 | A1* | 9/2014 | Bas ......................... G01V 1/30 702/14 |
| 2014/0278311 | A1 | 9/2014 | Dimitrov et al. |

OTHER PUBLICATIONS

Martinelli, Gabriele, et al.; "Dynamic Decision Making for Graphical Models Applied to Oil Exploration", Cornell University Library, 201 Olin Library Cornell University, Jan. 20, 2012, pp. 1-22.

Wingate, David, et al.; "A New Approach for Conditioning Process-Based Geologic Models to Well Data", Mathematical Geosciences, Springer Berlin, vol. 48, No. 4, May 1, 2015, pp. 371-397.

International Search Report and Written Opinion, PCT/US2017/020783, dated May 19, 2017, pp. 1-12.

Ahuja, Neelu Jyoti, et al.; "An Expert System for Seismic Data Interpretation Using Visual and Analytical Tools", International Journal of Scientific & Engineering Research, vol. 3, Issue 4, Apr. 2012.

Pitas, I., et al.; "Knowledge-Based Image Analysis for Geophysical Interpretation", Journal of Intelligent and Robotic Systems, vol. 7, Issue 2, pp. 115-137, Apr. 1993.

Nikravesh, Masoud, "Computational Intelligence for Geosciences and Oil Exploration", Studies in Fuzziness and Soft Computing, vol. 217, pp. 267-332, 2007.

Salom, Pierre, et al.; "Dynamic Picking System for 3D Seismic Data: Design and Evaluation", International Journal of Human-Computer Studies, vol. 67, Issue 7, pp. 551-560, Jul. 2009.

U.S. Appl. No. 14/985,860, filed Dec. 31, 2015, Xiaojie Huang.
U.S. Appl. No. 14/985,901, filed Dec. 31, 2015, Xiaojie Huang.
U.S. Appl. No. 15/061,800, filed Mar. 4, 2016, Ali Can.

* cited by examiner

CONTEXT BASED BOUNDED HYDROCARBON FORMATION IDENTIFICATION

CROSS REFERENCE TO RELATED APPLICATION

This application claims priority to and benefit of Provisional U.S. Application No. 62/304,007, entitled "CONTEXT BASED BOUNDED HYDROCARBON FORMATION IDENTIFICATION," filed Mar. 4, 2016, which is herein incorporated by reference in its entirety.

BACKGROUND

The subject matter disclosed herein relates to the analysis of seismic data, and more specifically, to identifying features of interest within a seismic data set.

Seismic data is collected and used for evaluating underground structures and features that might otherwise not be discernible. Such seismic data may be useful in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is in the interpretation and analysis of the large three-dimensional data sets that can be generated in a seismic survey project. In particular, analysis of such data sets may be tedious and time-consuming, potentially requiring months of manual work to analyze. Accordingly, it would be beneficial to reduce the amount of time required to a geologist to review and analyze a seismic data set.

BRIEF DESCRIPTION

Certain embodiments commensurate in scope with the original claims are summarized below. These embodiments are not intended to limit the scope of the claims, but rather these embodiments are intended only to provide a brief summary of possible forms of the claims. Indeed, the claims may encompass a variety of forms that may be similar to or different from the embodiments set forth below.

In one embodiment, a method of identifying bounded hydrocarbon formations of interest in a seismic data set includes retrieving a seismic data set, pre-processing the seismic data set, inputting the plurality of graphical model inputs and one or more rules to a graphical model, wherein the rules define a relationship between a plurality of attributes of a bounded hydrocarbon formation, running a graphical model on the graphical model inputs, post-processing the graphical model outputs, and displaying the ranked clusters in order of rank. Pre-processing the seismic data set includes calculating one or more auxiliary inputs, converting the seismic data and the one or more auxiliary inputs into a graphical model input format, and outputting a plurality of graphical model inputs. Running a graphical model on the graphical model inputs, by performing steps, including computing the one or more rules, creating hit maps of volumes within the seismic data set that satisfy the one or more rules, and outputting a plurality of graphical model outputs. Post-processing the graphical model outputs includes converting the plurality of graphical model outputs to a plurality of application-specific outputs, clustering the volumes within the seismic data set that satisfy the one or more rules into clusters, calculating one or more scores for each of the clusters according to how well each cluster satisfies the one or more rules, ranking the clusters based on each cluster's score; and outputting the ranked clusters.

In a second embodiment, a seismic data analysis system includes a processor and a display configured to display graphical representations of a seismic data set. The seismic data analysis system is configured to pre-process the seismic data set, input the plurality of graphical model inputs and one or more rules to a graphical model, wherein the rules define a relationship between a plurality of attributes of a bounded hydrocarbon formation, run a graphical model on the graphical model inputs, output a plurality of graphical model outputs, post-process the graphical model outputs, and display the ranked clusters in order of rank. Pre-processing the seismic data set includes calculating one or more auxiliary inputs, converting the seismic data and the one or more auxiliary inputs into a graphical model input format, and outputting a plurality of graphical model inputs. Running a graphical model on the graphical model inputs, by performing steps, including computing the one or more rules, creating hit maps of volumes within the seismic data set that satisfy the one or more rules, and outputting a plurality of graphical model outputs. Post-processing the graphical model outputs includes converting the plurality of graphical model outputs to a plurality of application-specific outputs, clustering the volumes within the seismic data set that satisfy the one or more rules into clusters, calculating one or more scores for each of the clusters according to how well each cluster satisfies the one or more rules, ranking the clusters based on each cluster's score; and outputting the ranked clusters.

In a third embodiment, a non-transitory computer readable medium includes executable instructions that when executed cause a processor to pre-process the seismic data set, input the plurality of graphical model inputs and one or more rules to a graphical model, wherein the rules define a relationship between a plurality of attributes of a bounded hydrocarbon formation, run a graphical model on the graphical model inputs, output a plurality of graphical model outputs, post-process the graphical model outputs, and display the ranked clusters in order of rank. Pre-processing the seismic data set includes calculating one or more auxiliary inputs, converting the seismic data and the one or more auxiliary inputs into a graphical model input format, and outputting a plurality of graphical model inputs. Running a graphical model on the graphical model inputs, by performing steps, including computing the one or more rules, creating hit maps of volumes within the seismic data set that satisfy the one or more rules, and outputting a plurality of graphical model outputs. Post-processing the graphical model outputs includes converting the plurality of graphical model outputs to a plurality of application-specific outputs, clustering the volumes within the seismic data set that satisfy the one or more rules into clusters, calculating one or more scores for each of the clusters according to how well each cluster satisfies the one or more rules, ranking the clusters based on each cluster's score; and outputting the ranked clusters.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
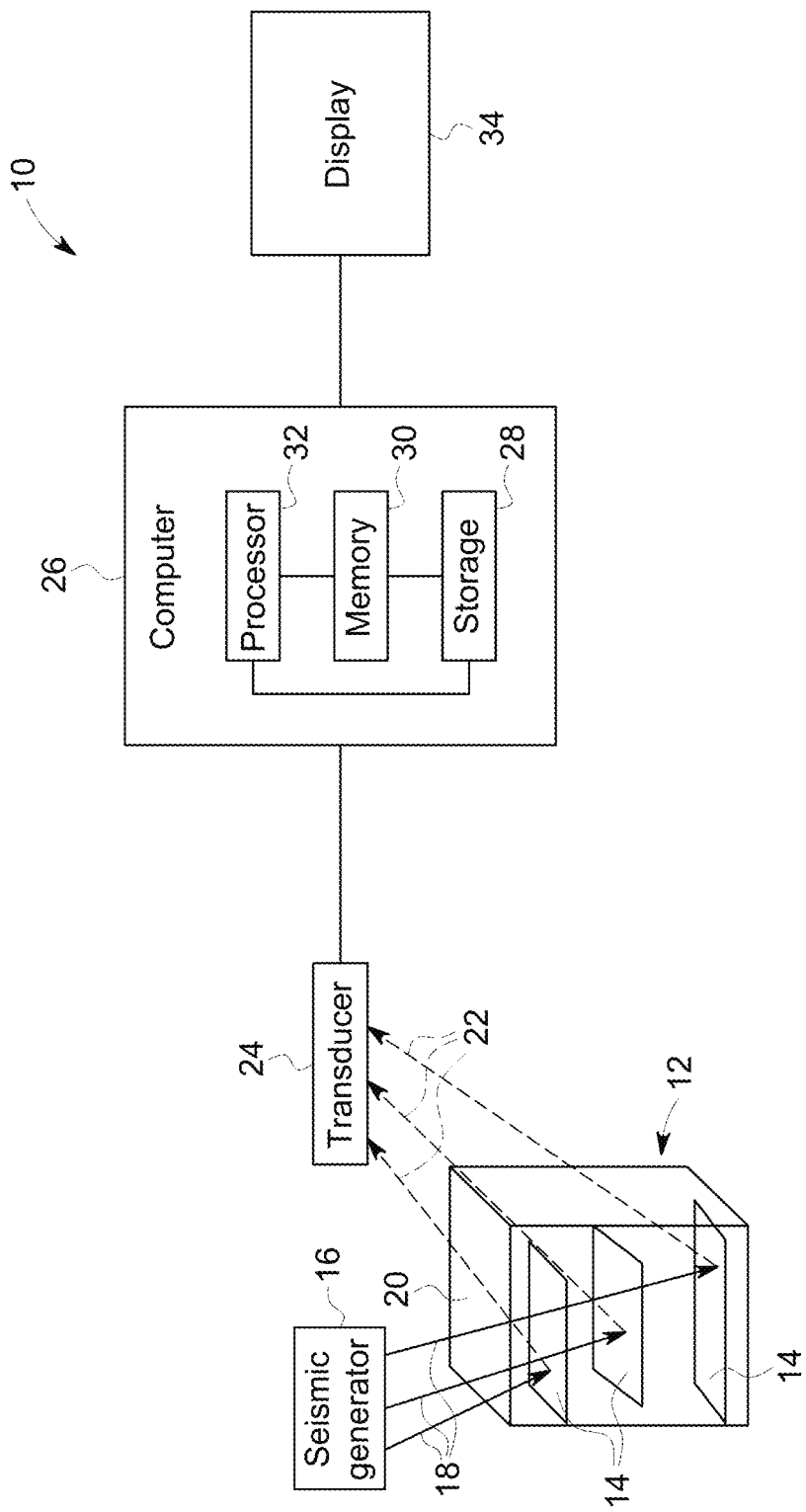
FIG. 1 shows a schematic of a seismic surveying system in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Seismic data may be used to analyze and detect subsurface features. For example, identification of geological objects (e.g., carbonate mounds, or other bounded hydrocarbon formations) from a three-dimensional (3D) seismic survey may be performed as part of prospecting for hydrocarbons (e.g., oil, natural gas, and so forth). As generally used herein, a geological object is a feature that may be of interest in the seismic data or some derived (attribute) data set. Such a geological object may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature.

Typically, an entire seismic dataset is traversed by an expert user (e.g., a geologist or geophysicist). This process may take a user on the order of weeks or months to complete. By providing a graphical model with one or more rules and then applying that model to the seismic data, one or more attributes of the geological object of interest may be identified in the seismic data and presented to the user, shortening the amount of time required to find geological objects in a data set. A previous disclosure of techniques for identifying geo-seismic objects is set forth in U.S. patent application Ser. No. 14/145,099 entitled "CONTEXT BASED GEO-SEISMIC OBJECT IDENTIFICATION" filed on Dec. 31, 2013, and incorporated into the present disclosure by reference in its entirety for all purposes.

The graphical model may use geological modeling and pattern recognition algorithms to model the context information using multiple seismic attributes, and make inferences by considering all these attributes jointly. The graphical model may be probabilistic graphical model, which mathematically describes a joint distribution of multiple random variables, wherein the variable dependency relationship between the variables captures the context information in the identification of bounded hydrocarbon formations. The dependency relationship between variables is defined by one or more rules between attributes. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time consuming and imprecise task of interpreting the seismic data and identifying geological objects within the acquired seismic data. For example, a single seismic volume may require months of manual work to analyze. As discussed herein, automated methods may make such time consuming work more feasible for a reviewer to interpret. However, automated interpretation of a 3D volume generated from seismic images may be difficult to achieve because the shape and other attributes of geological objects vary tremendously from location to location.

With this in mind, and as discussed herein, the present approach uses a model supplied with one or more rules to identify geological objects in the seismic data, score the geological objects, rank the geological object by score, and then display the possible geological object to a user in order of rank. With the foregoing discussion in mind, the present approach may be utilized in conjunction with a 3D seismic data set generated using any suitable seismic surveying system.

Turning to FIG. 1, a high-level overview of one such seismic surveying system 10 is provided by way of example. In the depicted example, a subsurface volume 12 is probed by the seismic surveying system 10. The subsurface volume 12 may typically include various layers or strata 14 at different depths and orientations within the volume 12. These various strata 14 define respective boundaries and transitions within the volume which may act to reflect waves (e.g., seismic or acoustic waves) propagating through the subsurface volume 12. Likewise, other features or geological objects within the subsurface volume may also include surfaces, transitions, or boundaries that act to reflect acoustic or seismic waves.

In the depicted example, a seismic generator 16 of some form (such as one or more controlled detonations, an air gun or cannon, or another suitable source of seismic waves) is part of the seismic surveying system 10. The seismic generator 16 can typically be moved to different positions on the surface of the volume 12 and can be used to generate seismic waves 18 at different positions on the surface 20 that penetrate the subsurface volume 12 under investigation. The various boundaries or transitions within the subsurface 12 (either associated with the various layers or strata 14 or with more complex geological objects) cause the reflection 22 of some number of the seismic waves 18. One or more transducers 24 at the surface 20 may be used to detect the waves 18 reflected by the internal structures of the subsurface volume 12 and to generate responsive signals (i.e., electrical or data signals).

These signals, when reconstructed, represent the internal boundaries and features of the subsurface volume 12. For example, in the depicted embodiment, the signals are provided to one or more computers 26 or other suitable processor-based devices that may be used to process the signals and reconstruct a volume depicting the internal features of the subsurface volume 12. In one embodiment, the computer 26 may be a processor-based system having a non-volatile storage 28 (such as a magnetic or solid state hard drive or an optical media) suitable for storing the data or signals generated by the transducer 24 as well as one or more processor-executable routines or algorithms, as discussed herein, suitable for processing the generated data or signals in accordance with the present approaches. In addition, the computer 26 may include a volatile memory component 30 suitable for storing data and signals as well as processor-executable routines or algorithms prior to handling by the processor 32. The processor 32 may, in turn, generate new data (such as a volumetric representation of the subsurface volume 12 and/or a set of features of interest for further analysis) upon executing the stored algorithms in accordance with the present approaches. The data or reconstructions generated by the processor 32 may be stored in the memory 30 or the storage device 28 or may be displayed for review, such as on an attached display 34.

Figure 2:
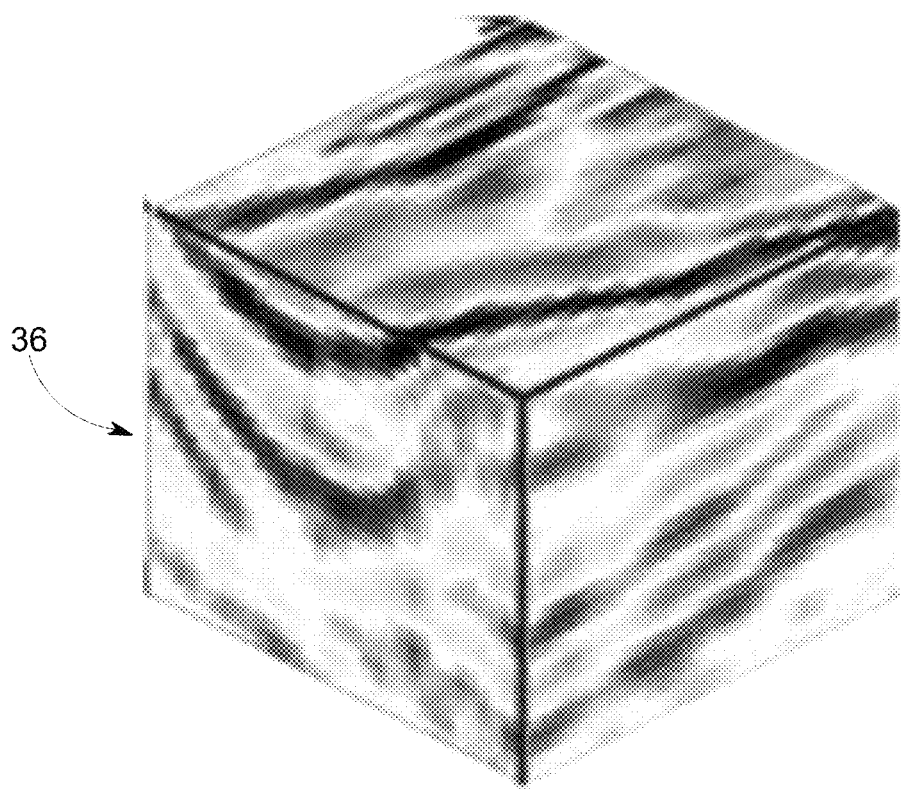
FIG. 2 shows a reconstruction of 3D seismic data in accordance with aspects of the present disclosure.

Turning to FIG. 2, a representation of a reconstruction 36 of 3D seismic data of a portion of a subsurface volume 12 is depicted. As depicted in FIG. 2, such a reconstruction 36 may depict features of the subsurface volume 12, such as various strata, layers, and geological objects, which due to geological processes and time scales, may be at various orientations relative to one another.

As will be appreciated, manual inspection of large amounts of such reconstructed data may be challenging and time-consuming. As previously discussed, a seismic data set may take a geologist months to analyze and existing automated systems may be unreliable because of the variance in geological object shapes and characteristics from location to location around the globe. Accordingly, the disclosed graphical model receives one or more rules input from an expert user (e.g., geologist). The graphical model parses the seismic data, identifies possible geological objects that comply with the rules, scores the possible geological objects, ranks the possible geological objects in descending order of score, and presents them to the user in order of rank. The user may interact with the graphical model through a user interface via the computer 26 and display 34 shown in FIG. 1, or via another computer.

Figure 3:
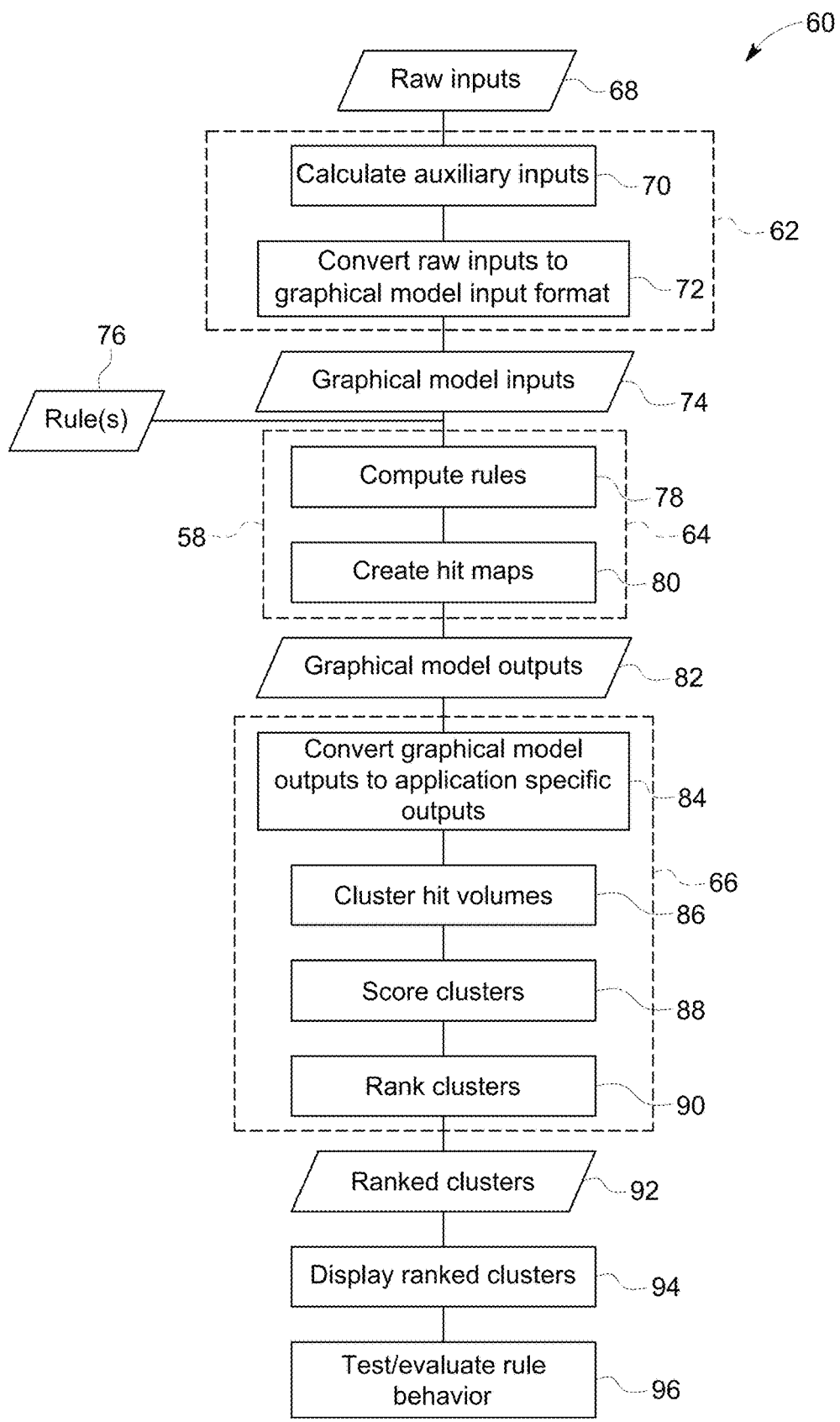
FIG. 3 is a flow chart for a process of using a graphical model to identify geological objects of interest in a seismic data set in accordance with aspects of the present disclosure.

FIG. 3 shows a process 60 of using a graphical model 58 to identify geological objects 36 of interest in a seismic data set. The process 60 shown includes three sub-processes: pre-processing 62, applying the model 58, and post processing 66. Pre-processing 62 converts the application-specific inputs into a format that the graphical model 58 can use. Similarly, post-processing 66 converts the outputs of the graphical model 58 to application-specific outputs. By using pre-processing 62 and post-processing 66 to account for the unique needs of a given application, the graphical model 58 may be kept robust enough to work for a wide range of applications.

In pre-processing 62, raw inputs 68 (e.g., seismic data) is pre-processed to prepare the raw inputs 68 for the graphical model 58. In block 70, the process 60 calculates auxiliary inputs. For example, if the rules input to the graphical model 58 for an application require application-specific inputs (e.g., derived qualities, attributes, or measurements for a geological object of interest) these outputs may be calculated or determined in pre-processing 62. In block 72, the process 60 converts the raw inputs to the graphical model 58 input format. As previously discussed, in order to keep the graphical model 58 as robust as possible and usable in a wide range of applications, the graphical model 58 may require a specific input format that may not be well suited for a specific application. Accordingly, in block 72, the process 60 converts the application-specific inputs (e.g., raw inputs, auxiliary inputs, seismic data, etc.) to the input format required by the graphical model. The inputs can be in the form of points, point sets, vector, vector sets, surfaces, surface sets, etc. The output of the pre-processing sub-process 62 are the graphical model inputs 74.

The graphical model inputs 74, along with one or more user-defined rules 76 are input to the graphical model 58.

The probabilistic graphical model 58 represents the conditional dependency relationship between multiple random variables through a dependency graph. By specifying the conditional dependency relationships between small number of variables, expressed as potential functions (e.g., rules 76), the full joint relationship (mathematically defined as joint distribution) between all variables are defined. From this joint distribution, the graphical model 58 makes inferences, such as the most likely configuration, the distribution for a bounded hydrocarbon formation (e.g., carbonate mound) given the measured attributes. The conditional dependency defined by the graph allows for compositional definition of the joint relationship, enabling efficient inference. The graphical model 58 is run on the inputs 74 (e.g., seismic data set). The sub-process 64 of running the graphical model 58 may include several blocks. For example, in block 78, the process 60 may compute the one or more rules 76 input to the process 60. Rules 76 input to the graphical model 58 may be expressed in an equation, or some other form. In some embodiments, one rule 76 may apply to a given range of data, while one or more other rules 76 may apply to the remaining ranges of data. In computing the one or more rules 76, the graphical model traverses the inputs 74 (e.g., seismic data set), and applies the appropriate rule to each data point or volume. When the condition of the rule 76 for a given data point or volume is satisfied, the graphical model 58 may register a hit (e.g., hit volume). In block 80, the graphical model creates hit maps of data points or volumes that satisfy the one or more rules 76. The hit maps will be discussed in more detail with regard to FIGS. 7A-7C, and may be further utilized in post-processing 66. The graphical model 58 outputs graphical model outputs 82, which may include hit maps, coordinates of hits, or some other standard graphical model outputs.

In post-processing 66, the graphical model outputs 82 are converted back into an application-specific format and any application-specific analysis may be performed. Typically, any clustering of hits, scoring of clusters, and ranking of clusters occurs in post-processing 66. For example, in the process shown in FIG. 3, the graphical model outputs 82 are converted to application-specific outputs (block 84). Once the outputs 82 are in an application-specific format, the process 60 may perform one or more post-processing tasks that may be specific to the specific application. For example, in block 86, the process 60 may cluster adjacent or nearby hit volumes. Accordingly, the process may group points within the seismic data set that satisfy the one or more rules into large regions of the seismic data that satisfy the rules. In block 88, the process may score the clusters. For example, the score may reflect the degree to which the hit volume satisfies the rules 76. In block 90, the clusters may be ranked by score. This will be discussed in more detail with regard to FIGS. 7 and 8. The output of post-processing 66 is an application-specific output. For example, in the process shown in FIG. 3, the output may be a group of ranked clusters 92.

In block 94, the outputs, in the embodiment shown in FIG. 3, a group of ranked clusters 92, may be displayed to the user. The display may be via the computer 26 shown in FIG. 1, a different computer, or some other device. In some embodiments, the process 60 may also perform testing, analysis, or some other evaluation of rule behavior (block 96).

The proceeding discussion describes a particular embodiment in which the disclosed techniques are used to identify carbonate mounds in seismic data sets. It should be understood, however, that the disclosed techniques may be used to find other bounded hydrocarbon formations in a seismic data set.

Figure 4A:
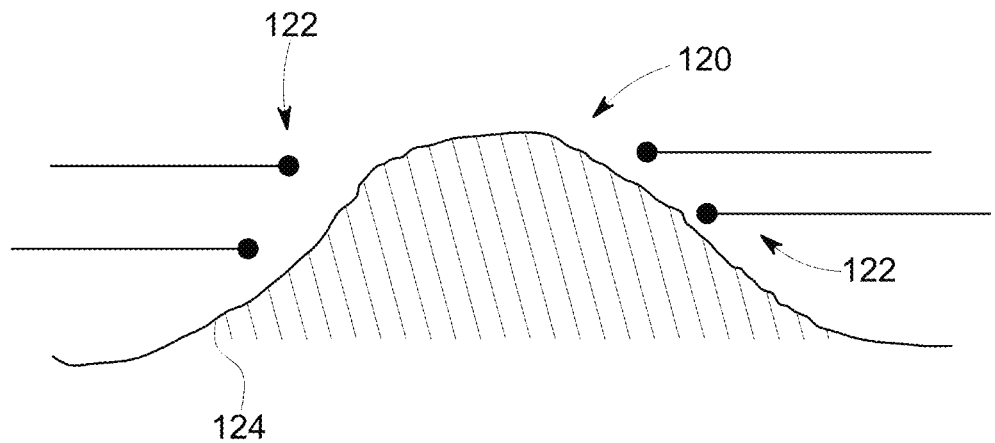
FIG. 4A shows a cross-sectional view of a carbonate mound in accordance with aspects of the present disclosure.
Figure 4B:
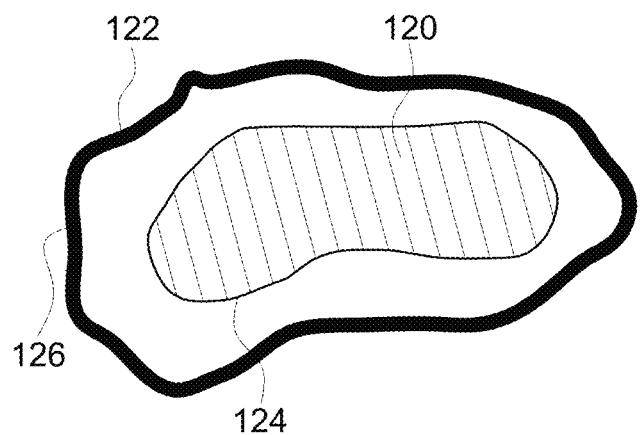
FIG. 4B shows a top-down view of a carbonate mound in accordance with aspects of the present disclosure.

FIGS. 4A and 4B show a cross-sectional view and a top-down view of a carbonate mound 120, respectively. Carbonate mounds 120 are one of many geological objects 36 that may be of interest. Carbonate rock exhibits good reservoir qualities. Carbonate mounds 120 also have a geometry that traps hydrocarbons. Strata with low permeability deposited on the flank of the carbonate mound, "stratigraphic terminations" 122, during and after the development of the mound 120 create a seal. In the seismic data, the change in properties from the stratigraphic terminations 122 to the carbonate mound 120 is expressed as an impedance contrast, predicted by a change in amplitude 126 polarity. This local combination of trap, reservoir, and seal makes carbonate mounds attractive exploration targets.

As can be seen in FIG. 4A, the geometry of the carbonate mound 120 is defined by a closure attribute 124. Similarly, in FIGS. 4A and 4B, the halo of stratigraphic terminations 122 define a termination attribute 126. As can be seen in FIG. 4B, the termination attribute 122 surrounds the closure attribute 124. By defining the relationship between the closure attribute 124 and the termination attribute 126 in a carbonate mound 120 with one or more rules, a graphical model 58 may take a seismic data set and determine which points, volumes, or regions within the seismic data set satisfy the one or more rules, and may thus contain a geological object 36 of interest.

Figure 5A:
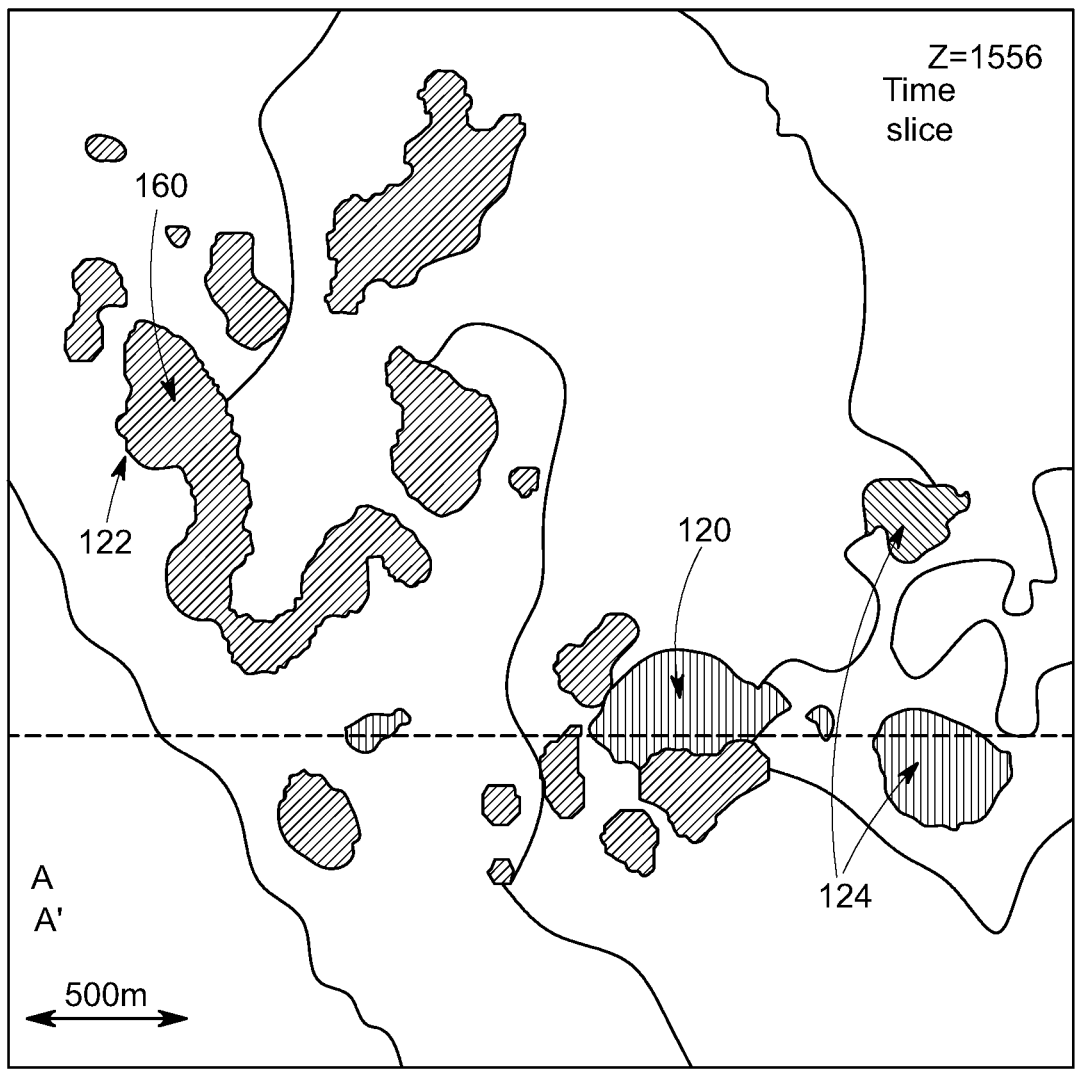
FIG. 5A shows an example of a carbonate mound in a seismic data set with a closure attributes and termination A attributes in accordance with aspects of the present disclosure.
Figure 5B:
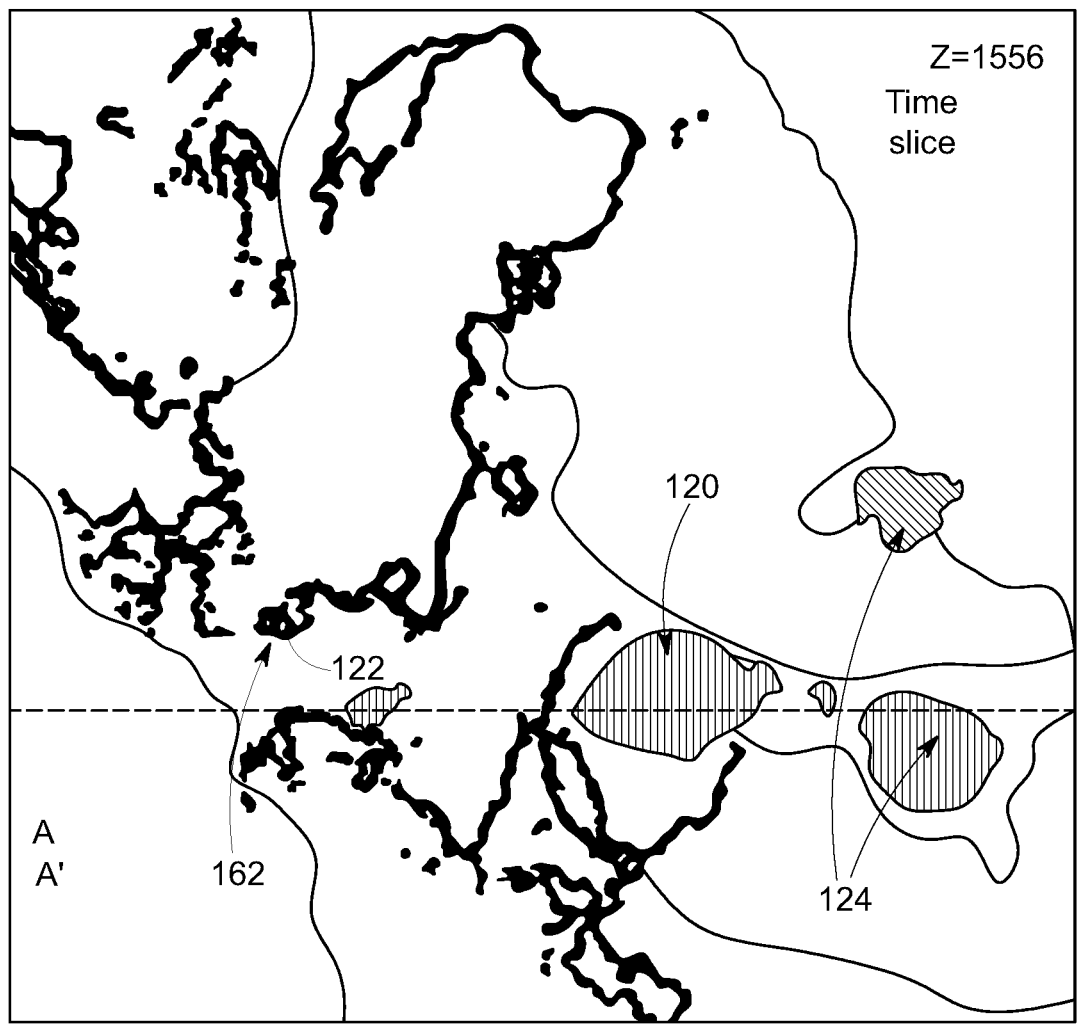
FIG. 5B shows an example of a carbonate mound in a seismic data set with a closure attributes and termination B attributes in accordance with aspects of the present disclosure.

FIGS. 5A and 5B show an example of a carbonate mound in the seismic data, each showing a drilled carbonate mound 120, termination attributes 122, and closure attributes 124. Two types of termination attributes are discussed in this disclosure: the termination A attribute (shown in FIG. 5A) and the termination B attribute 162 (shown in FIG. 5B). The termination A attribute is based upon the termination density of a skeleton file, whereas the termination B attribute 162 is based upon the two dimensional gradient. These carbonate mound 120 attributes follow geometric patterns or trends around the carbonate mound 120. For example, the polarity of the carbonate mound 120, representing the top of the carbonate mound, is indicated by an amplitude threshold, which is co-located with the closure attribute 124. The termination attributes surround the closure attribute. In the present embodiment, rules expressing these relationships between the attributes of a carbonate mound 120 are input to a graphical model 58, which traverses a seismic data set and identifies possible carbonate mounds 120 within the data set.

It should be understood, however, that these techniques (i.e., defining various the relationships between various attributes of a geological object 36 (e.g., bounded hydrocarbon formation) using rules 76, inputting the rules to a model 58, and then having the model 58 traverse a data set to identify the location of one or more geological objects 36 of interest) may be used for a wide range of geological objects 36. Accordingly, to keep the graphical model robust for a wide range of possible applications, application-specific tasks and/or components are off-loaded to pre-processing 62 and post-processing 66. The pre-processing 62 and post-processing 66 sub-processes convert the application-specific inputs 68 to the required format for graphical model 58 engine, and then transform the graphical model 58 output 82 to application-specific outputs 92.

Figure 6A:
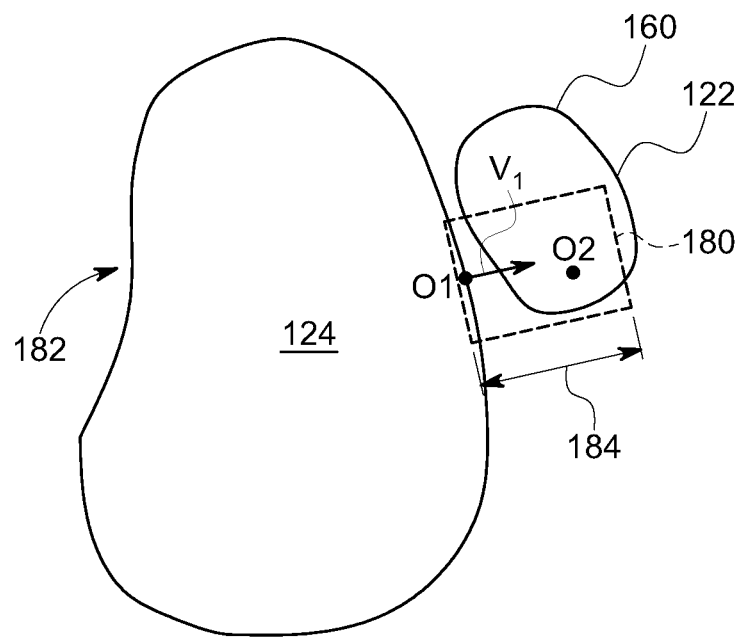
FIG. 6A is a schematic illustrating the "surround" rule as applied to a closure attribute and a termination A attribute in accordance with aspects of the present disclosure.
Figure 6B:
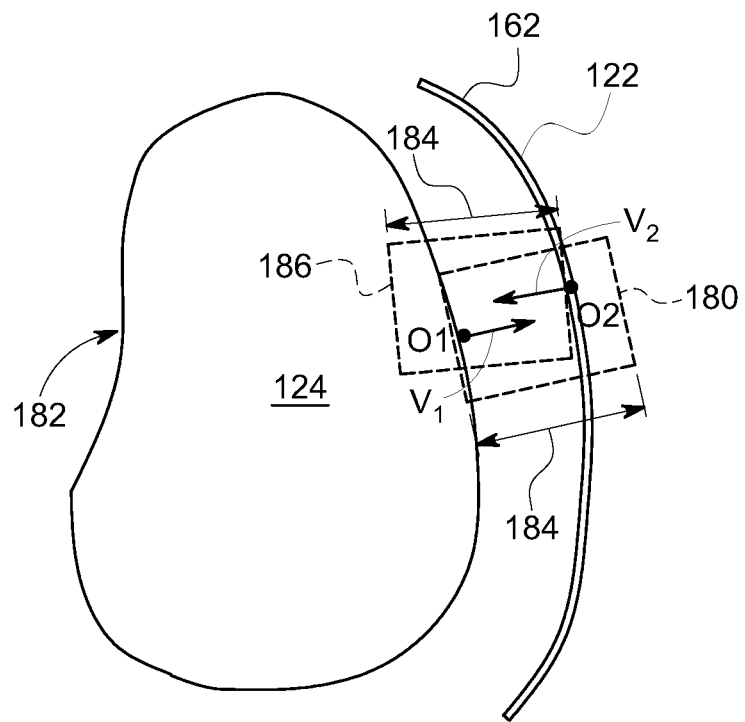
FIG. 6B is a schematic illustrating the "conforming surround" rule as applied to a closure attribute and a termination B attribute in accordance with aspects of the present disclosure.

FIGS. 6A and 6B show two rules that may be used to characterize the relationships between the closure 124 and termination 122 attributes associated with a carbonate mound 120, such that a graphical model 58 may identify possible carbonate mounds 120 in a seismic data set. Similar rules may be used for other bounded hydrocarbon formations. FIG. 6A is a schematic of the "surround" rule as applied to a closure attribute 124 and a termination A attribute. The surround rule uses an oriented bounding box constraint. Points inside a first oriented bounding box 180 satisfy the surround rule. The first oriented bounding box 180 is defined by the orientation of a closure boundary 182 of the closure attribute 124, and a threshold distance 184 as illustrated in FIG. 6A.

Hereinafter $O_1$ and $O_2$ are referred to as points, however it should be understood that $O_1$ and $O_2$ may be points, coordinates, volumes, voxels, etc. $O_2$ is said to surround $O_1$ when $O_2$ is within a threshold distance 184 proximity of $O_1$ and within a certain angular proximity of $O_1$, wherein $O_1$ is an oriented point and $O_2$ is a point. Alternatively, the surround rule may be expressed using the following equation:

$$\text{Score} = \begin{cases} 1, & |\Delta_{tline}| < T_{tline};\ 0 \le D_{1,parallel} \le T_{parallel};\ |D_{1,orthogonal}| \le T_{orthogonal} \\ 0, & \text{otherwise} \end{cases} \quad (1)$$

Wherein a score of 1 represents a hit (i.e., the surround rule is satisfied), and a score of zero means that the surround rule is not satisfied. $\Delta$ is the displacement vector from $O_1$ to $O_2$, and $v_1$ is the orientation vector of $O_1$. $D_{1,\,parallel}$ is the projection of $\Delta$ on $v_1$, expressed by the flowing equation:

$$D_{1,parallel} = \Delta \cdot v_1 \quad (2)$$

$D_{1,\,orthogonal}$ is the projection of $\Delta$ on the orthogonal direction of $v_1$, expressed by the flowing equation:

$$D_{1,orthogonal} = \Delta \cdot v_1^*, \quad (3)$$

for example, if $v_1 = (v_x, v_y)$ then its orthogonal vector is $v_1^* = (-v_y, v_x)$. $T_{tline}$ is the threshold for the time line neighboring definition, $T_{parallel}$ is the threshold for the distance between $O_1$ and $O_2$ along the orientation of $O_1$, and $T_{orthogonal}$ is the threshold for the distance between $O_1$ and $O_2$ along the orthogonal direction of the orientation of $O_1$. $\Delta_{tline}$ is the timeline component of $\Delta$.

FIG. 6B is a schematic of the "conforming surround" rule as applied to a closure attribute 124 and a termination B attribute 162. The conforming surround rule uses two bounding box constraints. Points inside the first and second oriented bounding boxes 180, 186 satisfy the conforming surround rule. Just as with the surround rule, the first oriented bounding box 180 is defined by the orientation of the closure boundary 182 of the closure attribute 124, and the threshold distance 184. The second oriented bounding box 186 is defined by the orientation of the termination B attribute 162 and the threshold distance 184.

$O_2$ is said to conforming surround $O_1$ when $O_2$ is within a threshold distance 184 proximity of $O_1$, $O_2$ is within a certain angular proximity of $O_1$, and $O_1$ is within a certain angular proximity of $O_2$, where $O_1$ and $O_2$ are oriented points. Alternatively, the surround rule may be expressed using the following equation:

$$\text{Score} = \begin{cases} 1 & |\Delta_{tline}| < T_{tline}, \\ & 0 \le D_{1,parallel} \le T_{parallel};\ |D_{1,orthogonal}| \le T_{orthogonal}, \\ & 0 \le D_{2,parallel} \le T_{parallel};\ |D_{2,orthogonal}| \le T_{orthogonal} \\ 0, & \text{otherwise} \end{cases} \quad (4)$$

where $\Delta_{tline}$ is the timeline component of $\Delta$. Wherein a score of 1 represents a hit (i.e., the conforming surround rule is satisfied), and a score of zero means that the surround rule is not satisfied. $\Delta$ is the displacement vector from $O_1$ to $O_2$, $v_1$ is the orientation vector of $O_1$, and $v_2$ is the orientation vector of $O_2$. $D_{1,\,parallel}$ is the projection of $\Delta$ on $v_1$, expressed by the flowing equation:

$$D_{1,parallel} = \Delta \cdot v_1 \quad (5)$$

$D_{1,\,orthogonal}$ is the projection of $\Delta$ on the orthogonal direction of $v_1$, expressed by the flowing equation:

$$D_{1,orthogonal} = \Delta \cdot v_1^* \quad (6)$$

$D_{1,\,parallel}$ is the projection of $-\Delta$ on $v_2$, expressed by the flowing equation:

$$D_{2,parallel} = \Delta \cdot v_2 \quad (7)$$

$D_{2,\,orthogonal}$ is the projection of $-\Delta$ on the orthogonal direction of $v_2$, expressed by the flowing equation:

$$D_{2,orthogonal} = \Delta \cdot v_2^* \quad (8)$$

$T_{tline}$ is the threshold for the time line neighboring definition, $T_{parallel}$ is the threshold for the distance between $O_1$ and $O_2$ along the orientation of $O_1$, and $T_{orthogonal}$ is the threshold for the distance between $O_1$ and $O_2$ along the orthogonal direction of the orientation of $O_1$.

In the carbonate mound application, attributes may include termination A attributes 160, termination B attributes 162, closure 124, and amplitude 126. Graphical model 58 code may include amplitude polarity and pairwise rules 76 (surround and conforming surround). In some embodiments, one node in the graphical model 58 can be associated with multiple attributes and multiple properties. When multiple attributes share the same node, those attributes have an implicit co-localization relationship. For example, closure 124 and amplitude 126 attributes have a co-localization relationship in carbonate mound 120 applications. Accordingly, they can share a single node. Thus, the graphical model 58 is simplified by eliminating one node and one pair-wise rule.

As previously discussed, pre-processing 62 and post-processing 66 convert the application-specific inputs 68 to the required format for the graphical model 58 engine, and then transform the graphical model 58 output to application-specific outputs 92. In this specific embodiment used to identify carbonate mounds, for example, the surround rule in graphical model 58 utilizes derived properties from the closure attribute 124, including the closure boundary 182 and the closure boundary orientation, which may be computed in pre-processing 62. The boundary 182 is calculated with morphological operations. The boundary orientation is estimated by computing the gradient of the distance transform of the closure mask. These auxiliary inputs are passed to the graphical model 58 engine, together with other attributes, to estimate the location of the true carbonate mound 120. In the current embodiment, data to support flexible rule definitions that require richer inputs than the raw attributes is calculated in pre-processing 62. Similarly, scoring and ranking may be performed in post-processing 66, where application specific or otherwise flexible combinations of different choices can be made. The graphical model 58 engine performs a maximum-a-posteriori (MAP) estimation and/or marginal estimation powered by various inference algorithms. The output 82 may include a configuration ranking and/or marginal hit maps.

Figure 7C:
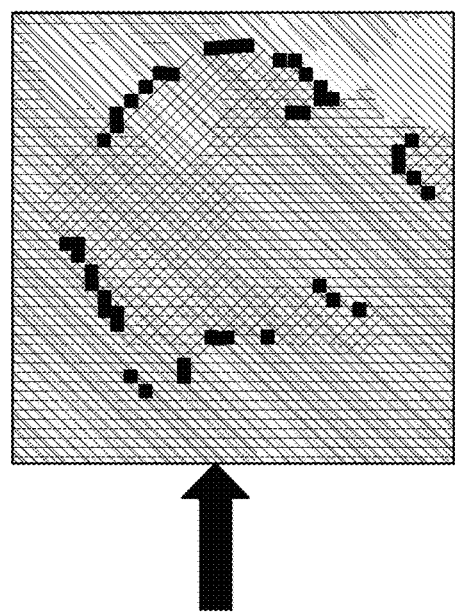
FIG. 7C is a schematic of the hit-volume displayed as a representation of the marginal distribution on certain attribute in accordance with aspects of the present disclosure.
Figure 7B:
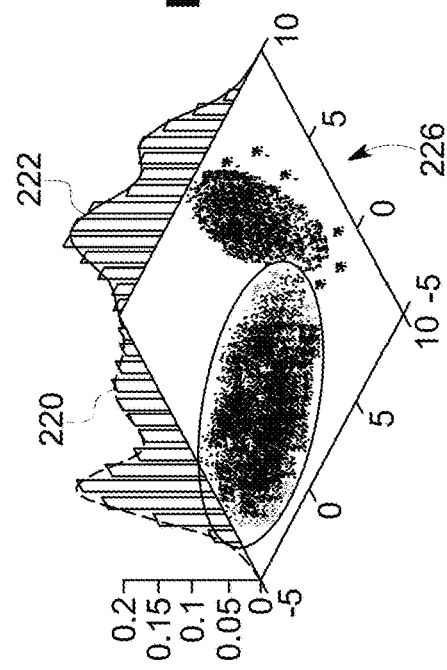
FIG. 7B is a sample joint distribution for a two node graphical model.
Figure 7A:
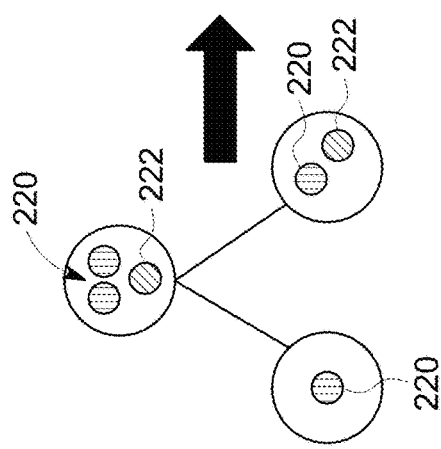
FIG. 7A is a schematic of the graphical model representing rules between attributes and specifying the joint distribution of all attributes in accordance with aspects of the present disclosure.

One or more rules 76 and graphical model inputs 74 that result from pre-processing 62 are input to the graphical model 58, which traverses the data to determine which data points satisfy the rules 76. When a point or volume satisfies a rule 76, the graphical model 58 registers it as a hit. The hit-volume of a certain attribute can be interpreted as the marginal distribution of the corresponding node in the graphical model 58. For example, $P(X_1)$ is the marginal distribution of attribute $X_1$, representing the probability of $X_1$ appearing at certain locations. For a carbonate mound 120, $X_1$ represents the closure attribute 124, and $X_2$ represents the termination attributes 122. For the carbonate mound 120 example, $P(X_1)$, the marginal closure hit volume is of interest. In a generalized graphical model 58, the graphical model 58 may generate hit-volumes for each attribute and/or each node. The graphical model 58 may also generate an overall hit-volume that is the summation of individual attribute hit-volumes. For some applications, the individual marginal hit volumes may be more useful, while for other applications, the overall hit-volume may be of more interest. For example, the overall hit volume may be more useful in applications such as in Direct Hydrocarbon Indicators (DHI), whereas individual marginal hit volumes are more useful in applications such as in carbonate mound 120 identification. FIGS. 7A-7C show examples of hit-volume generation based on the marginal distribution with a 2D feature. The graphical model 58 specifies the joint distribution of all attributes (e.g., first attribute 220 and second attribute 222 in FIG. 7A), the inference engine computes the marginal distribution of each attribute given the information of other attributes (FIG. 7B), and the hit-volume is displayed as a representation of the marginal distribution of an attribute (FIG. 7C).

Figure 8:
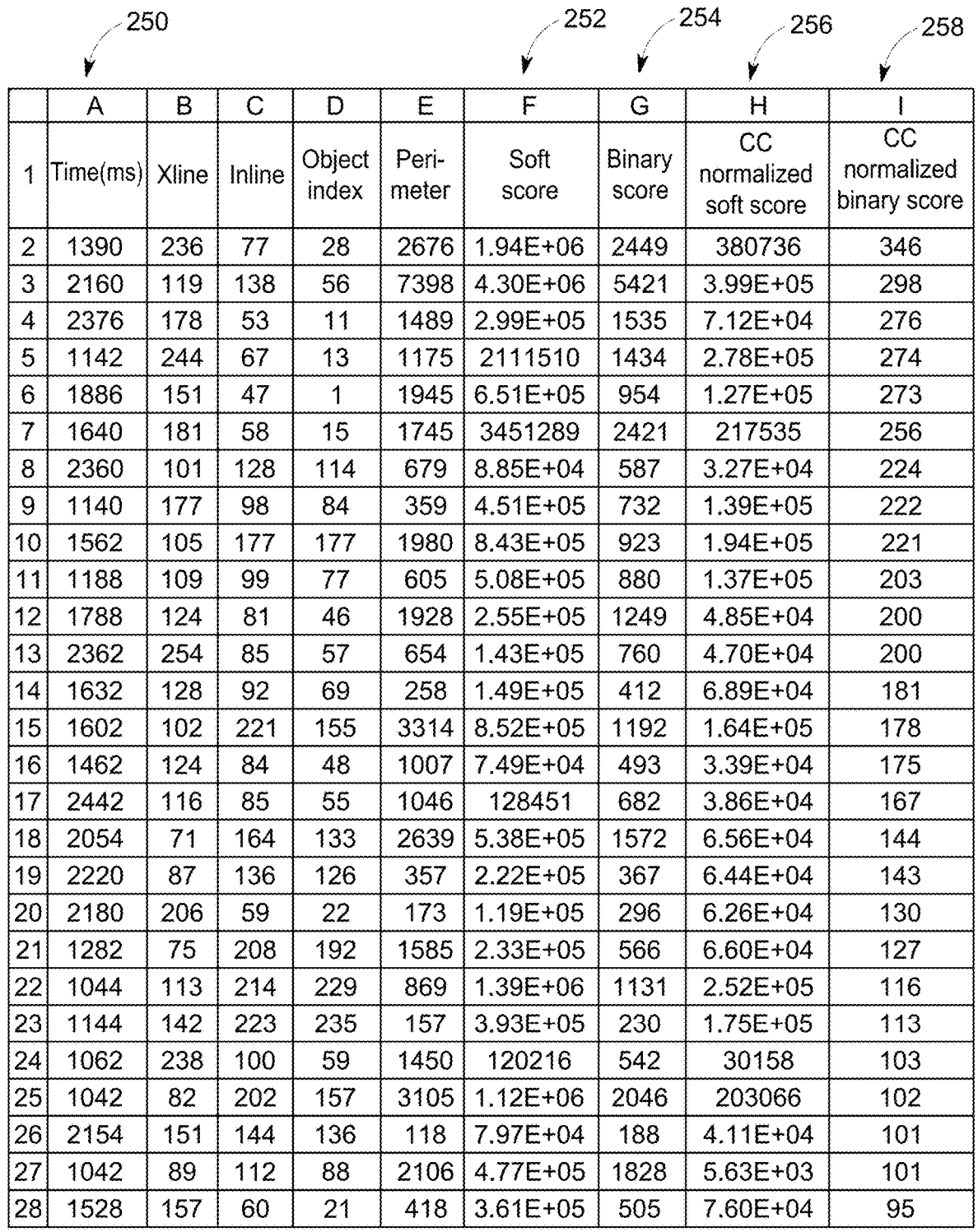
FIG. 8 is a sample screenshot of four scores for each cluster computed in post-processing in accordance with aspects of the present disclosure.

Hit volumes, both marginal and overall, are typically generated at a voxel resolution, but may be generated at a grid resolution if the data is subsampled. The user (e.g., a geologist or geophysicist) may review the raw hit volumes for quality control, or the user may review the leads at an object level rather than at voxel level. The object-level scores in post-processing 66 may be created by clustering the hit volumes, scoring the clusters and ranking the clusters in order of score. FIG. 8 shows an example of a table 250 of scores (soft score 252, binary score 254, normalized soft score 256, and normalized binary score 258), ranked by the normalized binary score 258. While overall hit volume may be more useful for clustering in some applications, for the present example (carbonate mounds) 120, marginal hit volumes are more useful in this application. For carbonate mound 120 applications, leads can be defined as connected clustered objects located on the closure attribute 124 with the right amplitude 126 polarity and a high aggregate score satisfying all the rules in the graphical model.

For example, a set of voxels on a closure attribute 124 with the right polarity is clustered based on connected component analysis. An expression for this cluster, $C_{i,j}$, containing point $(x_j, y_j, z_j)$ may be expressed by the following equation:

$$C_{i,j} = \{(x_j, y_j, z_j), \text{ such that } \text{Closure}(x_j, y_j, z_j) = 1 \text{ and } \text{Amplitude}(x_j, y_j, z_j) < 0\} \quad (9)$$

Wherein $i=1 \ldots N$, $j=1 \ldots N_i$, N is the total number of clusters, and $N_i$ is the number of voxels points or grid points in each i-th cluster. The second constraint in Equation 9 enforces the correct amplitude 126 polarity for this specific dataset. The points in each cluster may be 26-connected or 18-connected, depending how the connectedness is defined in the connected component analysis. Furthermore, clusters below a certain size threshold (which may be defined by the user) are ignored. Each cluster is then scored according the following equations:

$$\text{Score\_soft}_i = \sum_{j=1}^{N_i} P(X_1(C_{i,j})), \quad (10)$$

$$\text{Score\_binary}_i = \sum_{j=1}^{N_i} U(P(X_1(C_{i,j}))), \quad (11)$$

$$\text{Score\_soft\_cc}_i = \sum_{j=1}^{N_{i\_max}} P(X_1(C_{i,j})), \quad (12)$$

$$\text{Score\_binary\_cc}_i = \sum_{j=1}^{N_{i\_max}} U(P(X_1(C_{i,j}))), \quad (13)$$

where $P(X_1)$ is the marginal closure hit volume, $U(\ )$ is the unit-step function that maps the input to either zero or one, and $N_{i\_max}$ is the size of the largest connected component with the i-th cluster.

The four scores 252, 254, 256, 258 for each cluster are computed in post-processing, as shown in FIG. 8. Then, the clusters may be ranked based on any of the four scores 252, 254, 256, 258, or combination of these scores depending on the user's preference. For example if the data is noisy, connected scores may artificially break up clusters. Alternatively, if the noise level is low or moderate, connected scores can eliminate substantial number of false positives. Given that each score is data, geology and noise dependent, all scores are displayed, giving a user flexibility to choose how to rank the scores. When scores become available for a large number of datasets, the scores may be optimized by supervised learning or active learning methods.

Figure 9:
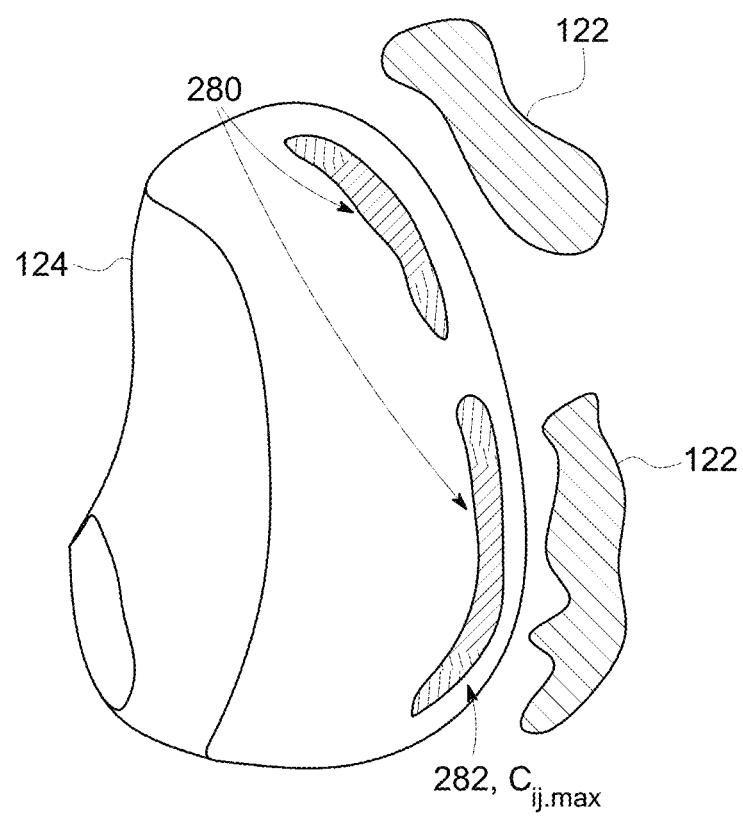
FIG. 9 shows a sample closure attribute and termination attributes of a possible carbonate mound identified using the disclosed techniques in accordance with aspects of the present disclosure.

In some embodiments, two similar metrics based on largest connected marginal hit volume on each of the clusters may be calculated during post-processing. For example, $C_{i,j}$ represents coordinates of the largest connected hit volume in the i-th cluster. FIG. 9 shows a sample closure attribute 124 and termination attributes 122 of a possible carbonate mound 120 identified using the disclosed techniques. Specifically, FIG. 9 illustrates the difference between the soft score 252 and the normalized soft score 256. The soft score aggregates all of the scores from a cluster, resulting in the marginal hit volumes 280. In contrast, the normalized soft score only aggregates the scores on the largest connect hit volume ($C_{ij\_max}$) on each cluster resulting in marginal hit volume 282. There is a similar corresponding difference between the binary score 254 and the normalized binary score 258.

Figure 10A:
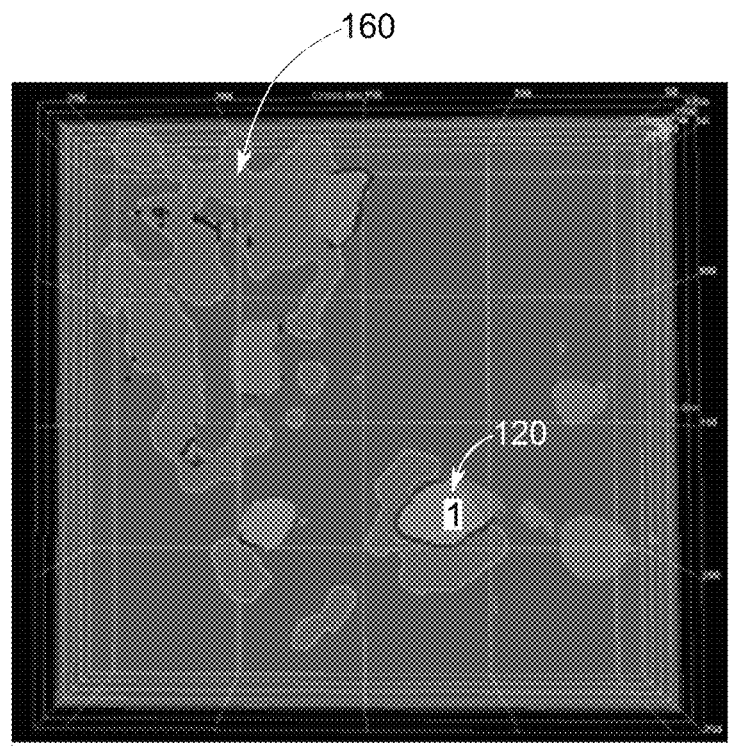
FIG. 10A shows a drilled carbonate mound surrounded by a termination A attribute resulting from a first sample test of the process shown in FIG. 3 in accordance with aspects of the present disclosure.
Figure 10B:
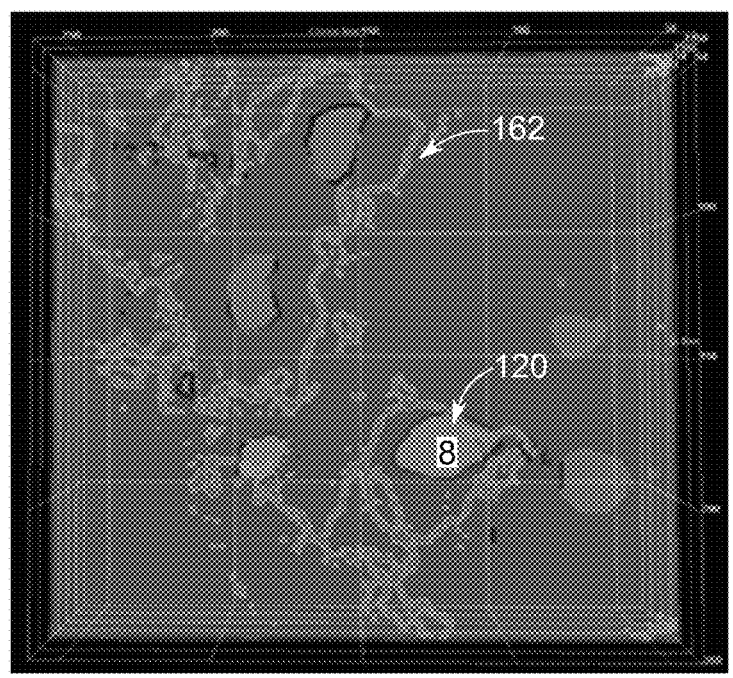
FIG. 10B shows a drilled carbonate mound surrounded by a termination B attribute resulting from a first sample test of the process shown in FIG. 3 in accordance with aspects of the present disclosure.

FIGS. 10A and 10B show the results of a first sample test of the process 60 shown in FIG. 3. In the first test, the process 60 was applied to a sample data set having a known drilled carbonate mound location 120. However, the test was performed blind, such that the graphical model 58 was unaware of the location of the drilled carbonate mound 120. In this specific test, the threshold distance 184 was set at 500 meters. The non-normalized soft score 252 (rather than binary score 254) was considered for both termination A and termination B 162. The sample dataset was evaluated by an expert geologist or geophysicist in parallel. As shown in FIG. 10A, applying the surround rule with termination A attributes 160, the process 60 ranked the drilled carbonate mound 120 as number 11 out of 247 candidate regions indicated by closure attributes 124 and amplitude attributes 126. Similarly, as shown in FIG. 10B, applying the surround rule with termination B attributes 162, the process 60 ranked the drilled carbonate mound 120 as number 30 out of 247 candidate regions indicated by closure attributes 124 and amplitude attributes 126. As can be seen in both FIGS. 10A and 10B, the closure attributes 124 are surrounded by termination attributes 160, 162. The "quality" of the attribute 122, 124 and the threshold distance 184 determine the hits. Positive hits occur where termination attributes 122 are outside of the closure attribute 124 (i.e., where the termination attribute 122 and closure attribute 124 are not co-located).

In a second test using the same sample data set, the conforming surround rule was applied and only termination B attributes 162 were considered. The conforming surround rule may be used to enforce bi-directional conformity between the closure attribute 124 and the termination attribute 122. The threshold distance, soft vs. binary, and normalized vs. non-normalized parameters were varied in an effort to improve the rank of the drilled carbonate mound 120 that was ranked number 30 out of 247 in the first test. The results of this second test may be found in Table 1 below. As shown in Table 1, the drilled carbonate mound reached a rank of 25 out of 247 when the score was not normalized and 22 out of 247 when the score was normalized.

TABLE 1

| Termination Attribute | Threshold Distance (meters) | Soft or Binary Scoring? | Normalized? | Rank (out of 247) |
|---|---|---|---|---|
| B | 400 | Soft | No | 30 |
| B | 400 | Soft | Yes | 23 |
| B | 400 | Binary | No | 27 |
| B | 400 | Binary | Yes | 23 |
| B | 600 | Soft | No | 25 |
| B | 600 | Soft | Yes | 22 |
| B | 600 | Binary | No | 31 |
| B | 600 | Binary | Yes | 23 |

In a third experiment, the process 60 was run combining both termination A attributes and termination B attributes 162. The termination A attributes were evaluated using the surround rule, while the termination B attributes 162 were evaluated using the conforming surround rule. The results of the third experiment may be seen in Table 2 below. As shown in Table 2, using the surround rule to evaluate the termination A attributes and the conforming surround rule to evaluate the termination B attributes 162, the rank of the drilled carbonate mound 120 rose to number 2 out of 247 when normalized and number 6 when not normalized. These results demonstrate the value of combining the contextual information of multiple termination attributes 122, and analyzing the same kinds of termination attributes 122 in multiple ways.

TABLE 2

| Termination Attribute | Threshold Distance (meters) | Soft or Binary Scoring? | Normalized? | Rank (out of 247) |
|---|---|---|---|---|
| B + A | 500 | Soft | No | 6 |
| B + A | 500 | Soft | Yes | 2 |
| B + A | 500 | Binary | No | 10 |
| B + A | 500 | Binary | Yes | 2 |

As previously discussed, though the embodiments disclosed herein predominantly relate to identifying carbonate mounds in a seismic data set, it should be understood that the disclosed techniques may be used to identify a wide range of bounded hydrocarbon formations in seismic data sets.

Technical effects of this disclosure include utilizing state of the art pattern recognition techniques to identify possible bounded hydrocarbon formations in a seismic data set, scoring the possible formations, and ranking the formations according to how the possible bounded hydrocarbon formations comply with one or more rules, thus reducing the time and cost associated with analyzing and interpreting a seismic data set.

This written description uses examples to disclose the claimed subject matter, including the best mode, and also to enable any person skilled in the art to practice the claimed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of identifying bounded hydrocarbon formations of interest in a seismic data set comprising:
   obtain a seismic data set;
   pre-processing the seismic data set, by performing steps comprising:
      calculating a boundary orientation;
      converting the seismic data set and the boundary orientation into a graphical model input format; and
      outputting a plurality of graphical model inputs;
   inputting the plurality of graphical model inputs and a plurality of rules to a graphical model, wherein the plurality of rules define relationships between a plurality of attributes of a bounded hydrocarbon formation, wherein the plurality of attributes comprise an amplitude attribute, a closure attribute, and a termination attribute;
   wherein one of the plurality of rules comprises a surround rule, wherein the surround rule is satisfied when:
      a second point in the termination attribute is within a first threshold distance of a first point on a closure boundary of the closure attribute; and
      the second point is within a first angular proximity of the first point;
      wherein the first point is an oriented point;
   wherein one of the plurality of rules comprises a conforming surround rule, wherein the conforming surround rule is satisfied when:
      the second point in the termination attribute is within the first threshold distance of the first point on the closure boundary of the closure attribute;
      the second point is within the first angular proximity of the first point; and
      the first point is within a second angular proximity of the second point;
      wherein the first point and the second point are both oriented points;
   running the graphical model on the graphical model inputs, by performing steps comprising:
      applying the plurality of rules;
      creating hit maps of volumes within the seismic data set that satisfy the plurality of rules; and
      outputting a plurality of graphical model outputs;
   post-processing the graphical model outputs, by performing steps comprising:
      converting the plurality of graphical model outputs to a plurality of application-specific outputs;
      clustering the volumes within the seismic data set that satisfy the plurality of rules into clusters;

calculating one or more scores for each of the clusters according to how well each cluster satisfies the plurality of rules;
ranking the clusters based on each cluster's score; and
outputting the ranked clusters; and
displaying the ranked clusters in order of rank.

2. The method of claim 1, wherein the bounded hydrocarbon formation is a carbonate mound.

3. The method of claim 1, wherein the termination attribute comprises a termination A attribute, a termination B attribute, or both.

4. The method of claim 3, wherein the surround rule is applied to the termination A attribute and the conforming surround rule is applied to the termination B attribute.

5. The method of claim 1, wherein the scores calculated for each cluster comprise soft score, binary score, normalized soft score, normalized binary score, or a combination thereof.

6. The method of claim 1, wherein the closure attribute and the amplitude attribute are co-located.

7. A seismic data analysis system comprising:
a processor; and
a display configured to display graphical representations of a seismic data set;
wherein the seismic data analysis system is configured to:
pre-process the seismic data set, by performing steps comprising:
calculate a boundary orientation;
convert the seismic data set and the boundary orientation into a graphical model input format; and
output a plurality of graphical model inputs;
input the plurality of graphical model inputs and one or more rules to a graphical model, wherein the rules define a relationship between a plurality of attributes of a bounded hydrocarbon formation, wherein the plurality of attributes comprise an amplitude attribute, a closure attribute, and a termination attribute, wherein one of the one or more rules is a conforming surround rule, wherein the conforming surround rule is satisfied when:
a second point in the termination attribute is within a threshold distance of a first point on a closure boundary of the closure attribute;
the second point is within a first angular proximity of the first point; and
the first point is within a second angular proximity of the second point;
wherein the first point and the second point are both oriented points;
run the graphical model on the graphical model inputs, by performing steps comprising:
apply the one or more rules;
create hit maps of volumes within the seismic data set that satisfy the one or more rules; and
output a plurality of graphical model outputs;
post-process the graphical model outputs, by performing steps comprising:
convert the plurality of graphical model outputs to a plurality of application-specific outputs;
cluster the volumes within the seismic data set that satisfy the one or more rules into clusters;
calculate one or more scores for each of the clusters according to how well each cluster satisfies the one or more rules;
rank the clusters based on each cluster's score; and
output the ranked clusters; and
display the ranked clusters in order of rank.

8. The seismic data analysis system of claim 7, wherein the termination attribute comprises a termination A attribute, a termination B attribute, or both.

9. The seismic data analysis system of claim 7, wherein one of the one or more rules is a surround rule, wherein the surround rule is satisfied when:
the second point in the termination attribute is within the threshold distance of the first point on the closure boundary of the closure attribute; and
the second point is within the first angular proximity of the first point;
wherein the first point is an oriented point.

10. A non-transitory computer readable medium comprising executable instructions that when executed cause a processor to:
obtain a seismic data set;
pre-process the seismic data set, by performing steps comprising:
calculate a boundary orientation;
convert the seismic data set and the one or more auxiliary into a graphical model input format; and
output a plurality of graphical model inputs;
input the plurality of graphical model inputs and one or more rules to a graphical model, wherein the rules define a relationship between a plurality of attributes of a bounded hydrocarbon formation, wherein the plurality of attributes comprise an amplitude attribute, a closure attribute, and a termination attribute, wherein one of the one or more rules is a surround rule, wherein the surround rule is satisfied when:
a second point in the termination attribute is within a first threshold distance of a first point on a closure boundary of the closure attribute; and
the second point is within first angular proximity of the first point;
wherein the first point is an oriented point;
run the graphical model on the graphical model inputs, by performing steps comprising:
apply the one or more rules;
create hit maps of volumes within the seismic data set that satisfy the one or more rules; and
output a plurality of graphical model outputs;
post-process the graphical model outputs, by performing steps comprising:
convert the plurality of graphical model outputs to a plurality of application-specific outputs;
cluster the volumes within the seismic data set that satisfy the one or more rules into clusters;
calculate one or more scores for each of the clusters according to how well each cluster satisfies the one or more rules;
rank the clusters based on each cluster's score; and
output the ranked clusters; and
display the ranked clusters in order of rank.

11. The non-transitory computer readable medium of claim 10, wherein the termination attribute comprises a termination A attribute, a termination B attribute, or both.

12. The non-transitory computer readable medium of claim 10, wherein one of the one or more rules is a conforming surround rule, wherein the conforming surround rule is satisfied when:
the second point in the termination attribute is within the first threshold distance of the first point on the closure boundary of the closure attribute;
the second point is within the first angular proximity of the first point; and the first point is within a second angular proximity of the second point;

wherein the first point and the second point are both oriented points.

* * * * *